Patented Feb. 6, 1940

2,189,664

UNITED STATES PATENT OFFICE 2,189,664

NITROGENOUS COMPOUNDS

Morris B. Katzman, Chicago, Ill., assignor to The Emulsol Corporation, Chicago, Ill.

No Drawing. Application July 18, 1938,
Serial No. 219,831

20 Claims. (Cl. 260—295)

This invention relates to new chemical compounds of the quaternary ammonium type which are characterized by possessing interface modifying properties rendering the same highly useful for the purposes for which such agents are employed in the various arts.

At least most of the novel compounds fall within the scope of the general formulae $$RO-(alk-NY)_m-CO-Z-(Q)_w \text{ and}$$

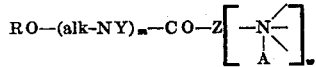

wherein R is an organic radical containing at least four carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is preferably a hydrocarbon residue, A is an anion, preferably of a solubilizing character, $m$ and $w$ are whole numbers, $w$ being preferably 1 or 2, Q is a quaternary ammonium radical, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member. By the term "quaternary ammonium radical" I mean one containing a pentavalent nitrogen wherein four valences are satisfied by carbon and the fifth valence by an anion.

A more limited aspect of the compounds of the invention may be represented by the general formula

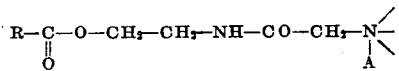

wherein R is a hydrocarbon radical or substituted hydrocarbon radical containing at least seven and preferably from eleven to seventeen carbon atoms.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Z and alk likewise may contain substituent groups such as those just mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention.

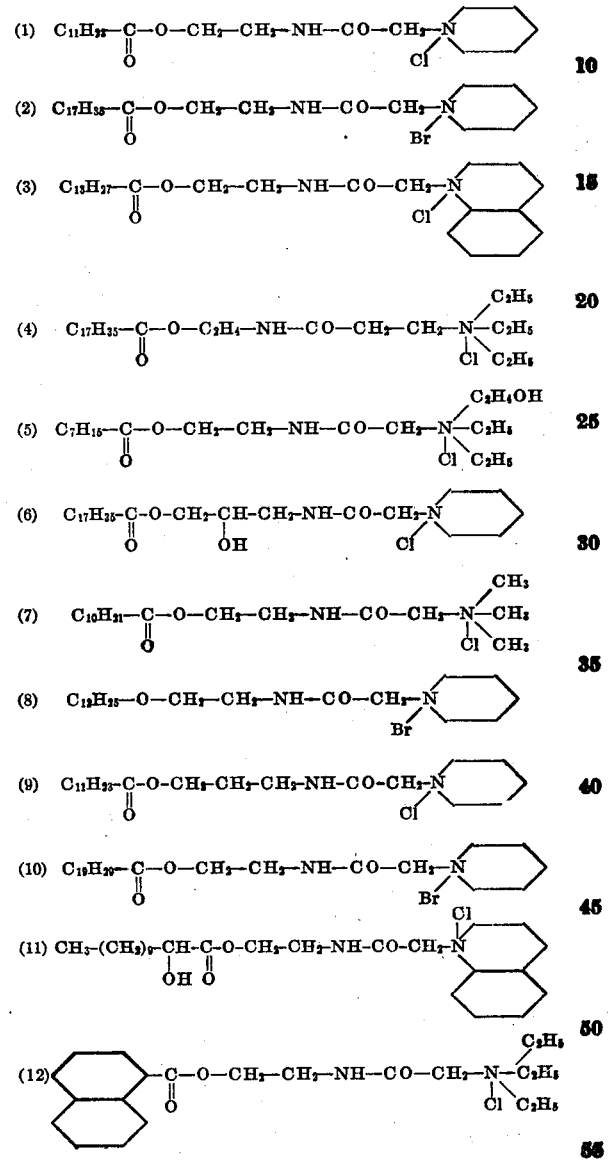

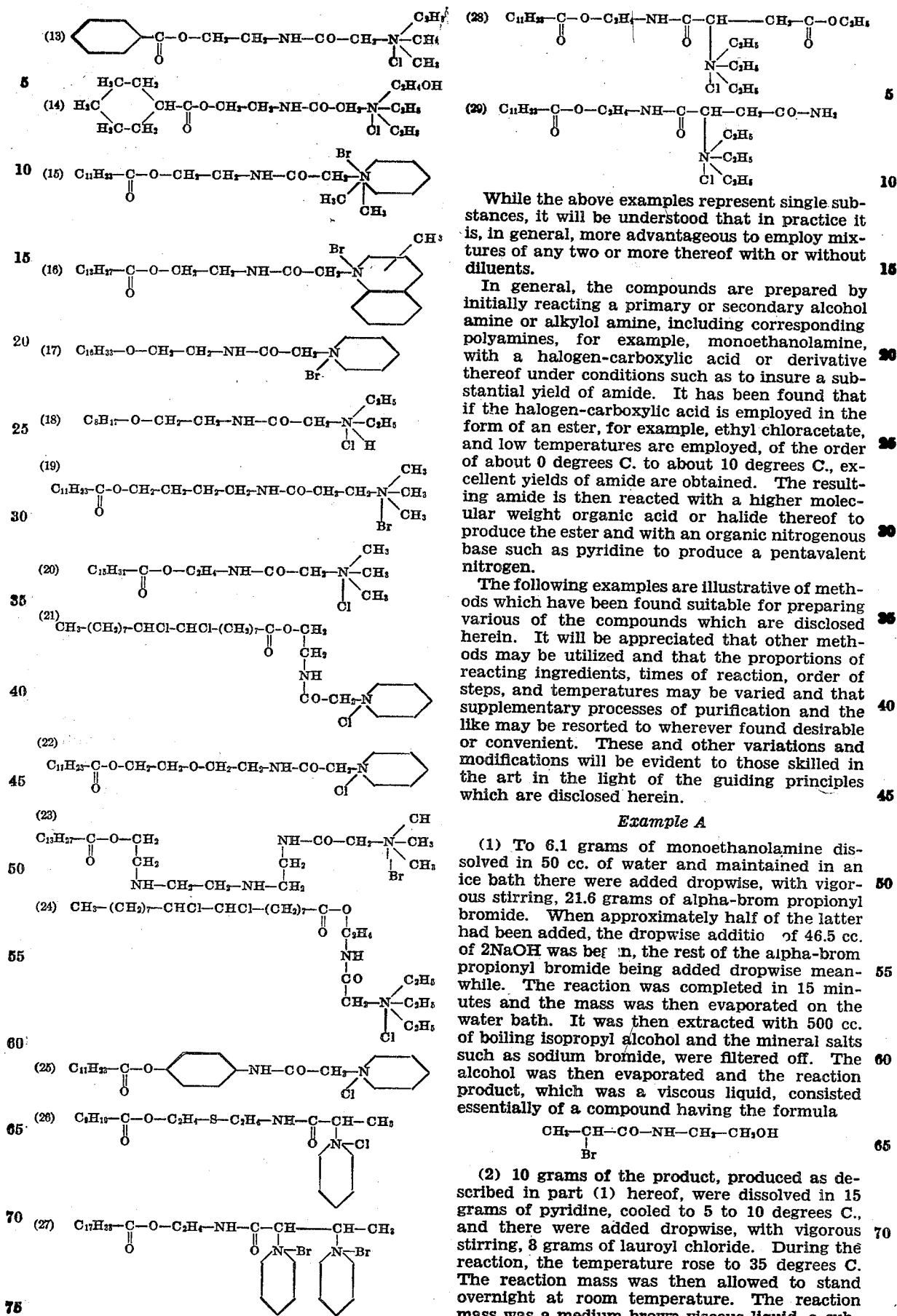

While the above examples represent single substances, it will be understood that in practice it is, in general, more advantageous to employ mixtures of any two or more thereof with or without diluents.

In general, the compounds are prepared by initially reacting a primary or secondary alcohol amine or alkylol amine, including corresponding polyamines, for example, monoethanolamine, with a halogen-carboxylic acid or derivative thereof under conditions such as to insure a substantial yield of amide. It has been found that if the halogen-carboxylic acid is employed in the form of an ester, for example, ethyl chloracetate, and low temperatures are employed, of the order of about 0 degrees C. to about 10 degrees C., excellent yields of amide are obtained. The resulting amide is then reacted with a higher molecular weight organic acid or halide thereof to produce the ester and with an organic nitrogenous base such as pyridine to produce a pentavalent nitrogen.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) To 6.1 grams of monoethanolamine dissolved in 50 cc. of water and maintained in an ice bath there were added dropwise, with vigorous stirring, 21.6 grams of alpha-brom propionyl bromide. When approximately half of the latter had been added, the dropwise additio of 46.5 cc. of 2NaOH was beg n, the rest of the alpha-brom propionyl bromide being added dropwise meanwhile. The reaction was completed in 15 minutes and the mass was then evaporated on the water bath. It was then extracted with 500 cc. of boiling isopropyl alcohol and the mineral salts such as sodium bromide, were filtered off. The alcohol was then evaporated and the reaction product, which was a viscous liquid, consisted essentially of a compound having the formula

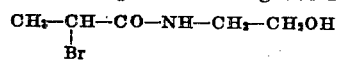

(2) 10 grams of the product, produced as described in part (1) hereof, were dissolved in 15 grams of pyridine, cooled to 5 to 10 degrees C., and there were added dropwise, with vigorous stirring, 8 grams of lauroyl chloride. During the reaction, the temperature rose to 35 degrees C. The reaction mass was then allowed to stand overnight at room temperature. The reaction mass was a medium brown viscous liquid, a substantial proportion of which contained a compound having the formula

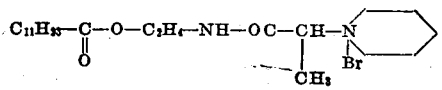

It was water-soluble, foamed or frothed well in water and had surface active characteristics rendering the same useful for flotation and other purposes as hereinafter set forth in greater detail.

(3) The reaction mass of part (2) was purified by adding thereto excess petroleum ether to extract the unreacted pyridine. The residue was then dried.

*Example B*

(1) 122 grams of ethyl chloracetate were added slowly to a 25% aqueous solution containing 122 grams of monoethanolamine, the reaction being conducted at a temperature of 0 degrees C. to 10 degrees C. At the end of 15 minutes the reaction appeared to be complete. Approximately 126 grams of oxalic acid were then added to neutralize the excess of ethanolamine, maintaining preferably a temperature of 0 degrees C. to 10 degrees C. The water present in the reaction mixture was then evaporated off on the water bath and 1000 grams of iso-propyl alcohol were added. The mass was then filtered, the monoethanolamine oxalate being insoluble, and the alcohol was distilled off from the filtrate on a water bath under vacuum. The resulting product, consisting essentially of N-$\beta$-hydroxyethyl, chloracetamide, was a semi-viscous liquid.

(2) 18 grams of the product prepared as described in part (1) hereof were dissolved in 25 grams of pyridine and cooled to 5 degrees C. 18 grams of caprylyl chloride were then added dropwise with vigorous stirring and the mass was then allowed to stand overnight. The reaction product, which contained a substantial proportion of a compound having the formula

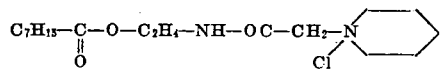

was soluble in water, foamed well, and possessed, in general, properties rendering the same useful for the purposes hereinafter set forth. If desired, the reaction mass may be purified by extraction with petroleum ether, as described in the previous example.

It will be understood, particularly in the light of the examples hereinabove, that the novel compounds of the present invention may contain one or more imino or like linkages. Thus, for example, in place of employing monoethanolamine or monopropanolamine or the like as a starting material, compounds may be utilized having a plurality of imino groups such as the following, by way of illustration:

(a) $HO-CH_2-CH_2-NH-CH_2-CH_2-NH-CH_2-CH_2-NH_2$ (b) $HO-CH_2-CH_2-CH_2-NH-CH_2-CH_2-CH_2-NH-CH_2-CH_2-CH_2-NH_2$ (c) $HO-\left(CH_2-\underset{OH}{CH}-CH_2-NH\right)_3-CH_2-\underset{OH}{CH}-CH_2-NH_2$ As Examples 8, 17 and 18 show, the compounds may also comprise higher molecular weight ether derivatives. The higher molecular weight ethers may be prepared, for example, by reacting a compound containing a reactive halogen, for example,

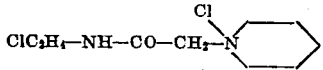

with an alkali metal alcoholate such as sodium laurylate ($C_{12}H_{25}ONa$) in accordance with general methods known in the art. In general, the higher molecular weight esters are more satisfactory for most purposes.

The higher molecular weight organic radical represented by R in the general formulae may, as stated, be derived from various sources. Among such sources may be mentioned straight chain and branched chain higher molecular weight carboxylic, aliphatic, and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

It has previously been indicated that the anion represented by the letter A in the general formula illustrating most of the novel agents of the present invention is preferably a solubilizing anion such as chlorine, bromine or iodine. Other anions may be substituted therefor as, for example, $OH^-$, $HSO_4^-$, $RSO_4^-$, $C_6H_5SO_3^-$, $NO_3^-$, acetate, propionate, caproate, laurate, oleate, stearate, borate, phosphate, or some other organic or inorganic anion. As a general rule the halogen derivatives are particularly satisfactory.

The halogeno-carboxylic acids or other derivatives thereof, preferably in the form of their esters with ethyl alcohol or the like, which are reacted with the primary and secondary alcohol amine may be selected from a relatively large class including mono-, di- and poly-carboxylic derivatives as, for example, mono-chloracetic acid, mono-bromacetic acid, chloracetyl chloride, bromacetyl bromide, mono iodoacetic acid, alpha-chlor propionic acid alpha-chlor butyric acid, alpha-bromo capric acid, mono-chlor succinyl chloride, di-chlor succinyl chloride, mono-chlor succinic acid, di-chlor succinic acid, di-chlor glutaryl chloride, nitrochloro-benzoyl chlorides and the like. Of particular utility are ethyl chloracetate and ethyl bromacetate.

The primary and secondary alcohol amines or alkylolamines which are reacted with the chloracetyl chloride or the like to produce the halogen-containing amides include, among others, by way of example, monoethanolamine, diethanolamine, monopropanolamine, dipropanolamine, monobutanolamine,

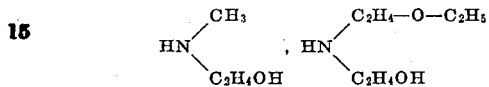

monocyclohexyl, β-hydroxyethyl amine; monobutyl, β-hydroxyethyl amine; N-β-hydroxyethyl aniline; 1-amino-propandiol-2,3; sorbitol monoamine, and the like.

The pentavalent nitrogen present in the novel substances of the present invention may be introduced into the molecule by means of various organic nitrogenous bases as, for example, alcohol amines and alkylol-, arylol- and aralkylol amines including mono-, di- and tri- ethanolamine and mixtures thereof such as are, for example, present in so-called commercial triethanolamine, propanolamines, butanolamines, pentanolamines, hexanolamines, glycerolamines, dibutyl ethanolamines, diethanol ethyl amine, cyclohexyl ethanolamine, diethanol cyclohexylamine, ethanol aniline, alkylol polyamines such as alkylol derivatives of ethylene diamine, mono-methyl mono-ethanolamine, diethyl-monoethanolamine, 1-amino-2, 3 propanediol, 1,2-diaminopropanol; alkylamines such as butyl amine, hexylamine, dimethylamine, ethylene diamine, diethylene triamine, triethylene tetraamine, mono-methyl ethylene diamine, mono-ethyl diethylene tetraamine, mono-allyl amine, aromatic and heterocyclic bases such as benzylamine, cyclo-hexyl-ethyl-aniline, morpholine, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

The compounds of this invention have utility in various arts in which interface modifying agents are employed. They are resistant to precipitation by calcium and magnesium salts and are compatible with acid and alkali media. They may be utilized in washing and laundering and the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. It the dyeing of textiles they may be employed as assistants in order to bring about even level shades.

They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water in-oil type which are encountered in oilfield operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present inventions may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulphoacetate, dioctyl sodium sulphosuccinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-Red oils; compounrs of the type of isopropyl naphthalene sodium sulphonate, and other classes of wetting agents.

Wherever the term "higher" is employed as referring to higher molecular weight organic acids or the like, it will be understood to cover compounds or radicals having at least six carbon atoms unless otherwise specifically stated.

What I claim as new and desire to protect by Letters Patent of the United States is:

1. Chemical compounds corresponding to the general formula

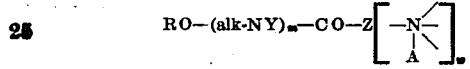

wherein R is an organic radical containing at least four carbon atoms, alk is a hydrocarbon residue with or without interruptions or substitutions, Y is a member selected from the group consisting of hydrogen, alkyl, cycloalkyl, alkoxyl, aralkyl, aryl, and alkylol, Z is a hydrocarbon residue with or without interruptions or substitutions, A is an anion, m and w are small whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

2. Quaternary ammonium chemical compounds corresponding to the general formula

RO—(alk-NY)ₘ—CO—CH₂—N⟨A wherein R is an aliphatic radical containing from eight to eighteen carbon atoms, alk is a hydrocarbon residue with or without interruptions or substitutions, Y is a member selected from the group consisting of hydrogen, alkyl, cycloalkyl, alkoxyl, aralkyl, aryl, an alkylol, A is halogen, m is a small whole number, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

3. Quaternary ammonium chemical compounds corresponding to the general formula

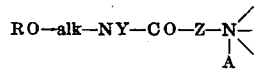

wherein R is an organic radical containing at least four carbon atoms, alk is alkylene, Y is a member selected from the group consisting of hydrogen, alkyl, cycloalkyl, alkoxyl, aralkyl, aryl, and alkylol, Z is a hydrocarbon residue, A is an anion, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

4. Chemical compounds corresponding to the general formula

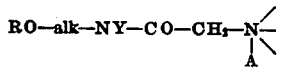

wherein R is an aliphatic radical containing from eight to eighteen carbon atoms, Y is a member selected from the group consisting of hydrogen, alkyl, cycloalkyl, alkoxyl, aralkyl, aryl, and alkylol, A is halogen, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

5. Chemical compounds corresponding to the general formula

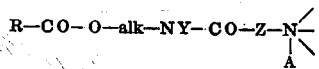

wherein R—CO is an acyl radical containing at least four carbon atoms, alk is alkylene, Y is a member selected from the group consisting of hydrogen, alkyl, cycloalkyl, alkoxyl, aralkyl, aryl, and alkylol, Z is a hydrocarbon residue, A is an anion, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

6. Chemical compounds corresponding to the general formula

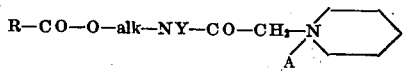

wherein R—CO is an acyl radical containing at least eight carbon atoms, alk is alkylene, Y is a member selected from the group consisting of hydrogen, alkyl, cycloalkyl, alkoxyl, aralkyl, aryl, and alkylol, and A is halogen.

7. Quaternary ammonium chemical compounds corresponding to the general formula

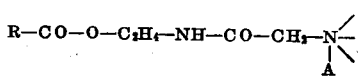

wherein R—CO is an acyl radical containing from eight to eighteen carbon atoms, A is halogen, and the three indicated valence bonds attached to nitrogen are satisfied by radicals of the class consisting of alkyls, cyclo-alkyls, alkylols, aralkyls, aryls, aralkylols, and the radical of a heterocyclic ring of which the nitrogen is a member.

8. A chemical compound having the formula

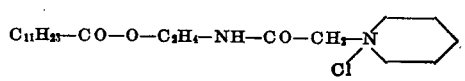

9. Chemical compounds in accordance with the formula

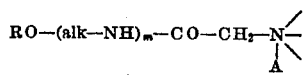

wherein R is a radical selected from the group consisting of alkyl and acyl radicals containing from eight to eighteen carbon atoms, alk is alkylene, m is a whole number, and A is halogen.

10. Chemical compounds in accordance with the formula

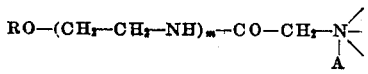

wherein R is a radical selected from the group consisting of acyl and alkyl radicals containing at least four carbon atoms, $m$ is a whole number, and A is an anion.

11. Chemical compounds in accordance with the formula

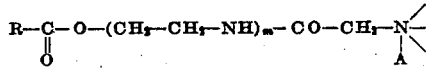

where R—C=O is an acyl radical containing from eight to eighteen carbon atoms, $m$ is a whole number, and A is halogen.

12. Chemical compounds in accordance with the formula

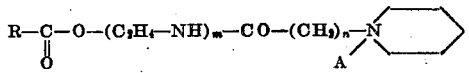

wherein R—C=O is a fatty acid acyl radical containing from eight to eighteen carbon atoms, $m$ and $n$ are small whole numbers, and A is halogen.

13. The process of producing chemical compounds having the general formula

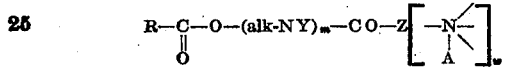

wherein R—C=O is an acyl radical containing at least four carbon atoms, alk stands for alkylene, Y is a member selected from the group consisting of hydrogen, alkyl, cycloalkyl, alkoxyl, aralkyl, aryl, and alkylol, A is an anion, Z is a hydrocarbon residue, $m$ and $w$ are whole numbers, and at least one of the three indicated valence bonds attached to nitrogen is satisfied by a radical of the class consisting of alkyls, cycloalkyls, alkylols, aralkyls, aryl, aralkylols and the radical of a heterocyclic ring of which the nitrogen is a member, which comprises the steps of reacting a member selected from the group consisting of organic acids and halides thereof containing at least four carbon atoms, a tertiary organic nitrogenous base, and a compound of the general formula HO—(alk—NY)$_m$—CO(—Z—halogen)$_w$ wherein alk, Y, $m$, $w$, and Z have the foregoing significance.

14. The process of claim 13 wherein the organic acid is a fatty acid having from eight to eighteen carbon atoms, and the organic nitrogenous base is pyridine.

15. The process of producing chemical compounds having the general formula

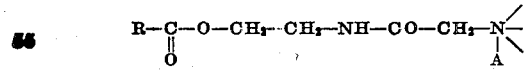

wherein R—C=O is an acyl radical having from eight to eighteen carbon atoms, A is an anion, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member, which comprises the steps of reacting a halide of an organic acid having from eight to eighteen carbon atoms, a tertiary organic nitrogenous base, and a compound of the general formula HO—C$_2$H$_4$—NH—CO—CH$_2$—halogen 16. The process of producing the compound

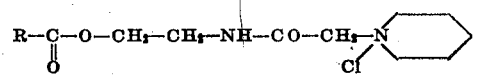

wherein R—C=O is an acyl radical containing from eight to eighteen carbon atoms, which comprises reacting N—β—hydroxyethyl, chloracetamide, with pyridine and with an aliphatic acid halide containing from eight to eighteen carbon atoms.

17. The process of claim 16 wherein the aliphatic acid halide comprises a halide produced from higher fatty acids corresponding to those found in waxes and triglyceride oils and fats.

18. Chemical compounds containing the nucleus

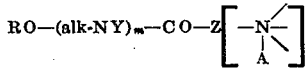

wherein R is an organic radical containing at least four carbon atoms, alk is a hydrocarbon residue with or without interruptions or substitutions, Y is a member selected from the group consisting of hydrogen, alkyl, cycloalkyl, alkoxyl, aralkyl, aryl and alkylol, Z is a hydrocarbon residue with or without interruptions or substitutions, A is an anion, and $m$ and $w$ are small whole numbers.

19. Chemical compounds corresponding to the general formula

R—CO—O—(alk—NY)$_m$—CO—Z—Q wherein R—CO is an acyl radical containing at least four carbon atoms, alk is alkylene, Y is a member selected from the group consisting of hydrogen, alkyl, cycloalkyl, alkoxyl, aralkyl, aryl, and alkylol, Z is a hydrocarbon residue, $m$ is a whole number, and Q is a quaternary ammonium radical.

20. Chemical compounds corresponding to the general formula

R—CO—O—(alk—NH)$_m$—CO—CH$_2$—Q wherein R—CO is an aliphatic acyl radical containing at least eight carbon atoms, alk is alkylene, $m$ is a whole number, and Q is a quaternary ammonium radical.

MORRIS B. KATZMAN.